UNITED STATES PATENT OFFICE.

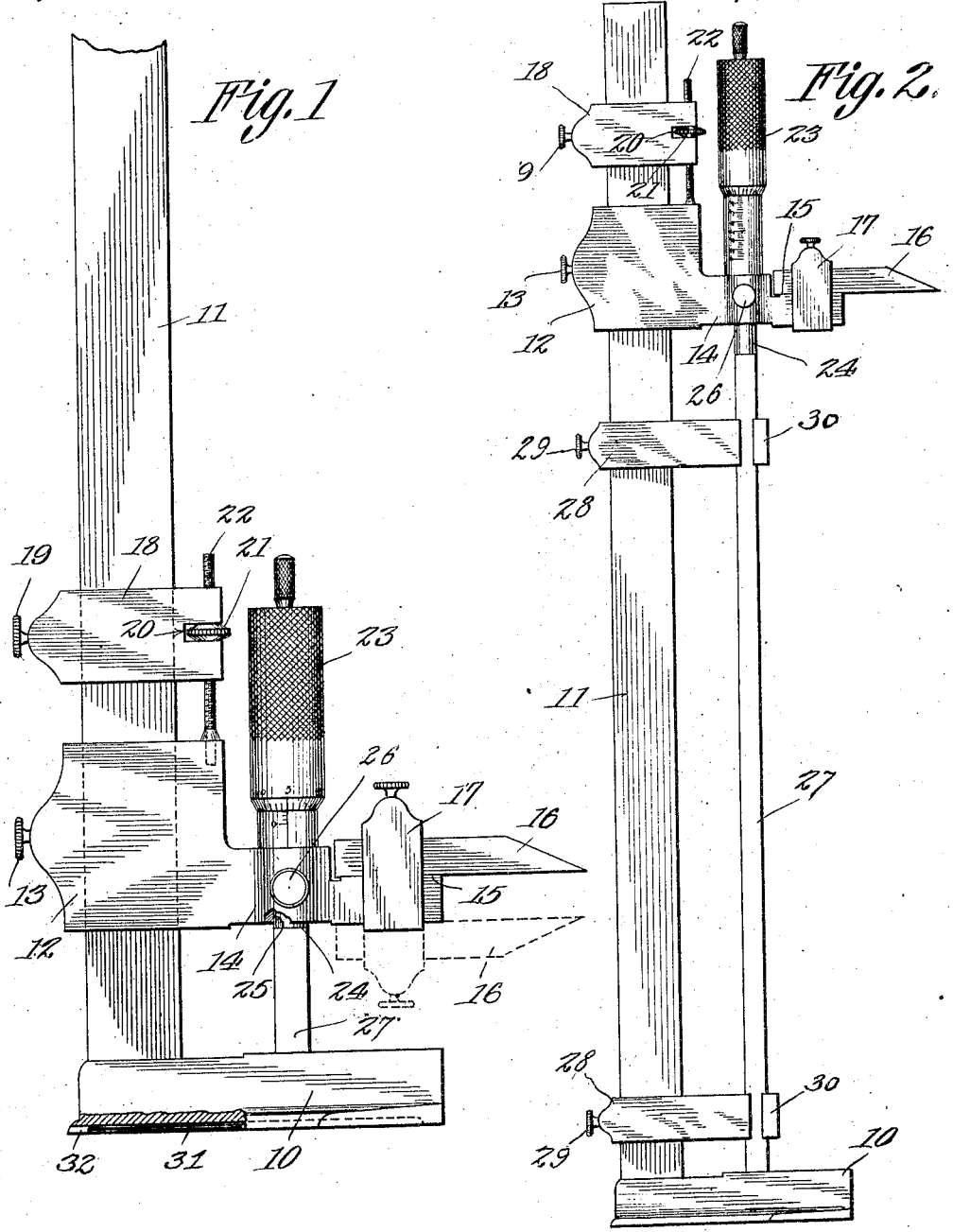

EDWARD CORFF, OF CHICAGO, ILLINOIS.

GAGE.

1,103,265.   Specification of Letters Patent.   Patented July 14, 1914.

Application filed November 7, 1913. Serial No. 799,720.

*To all whom it may concern:*

Be it known that I, EDWARD CORFF, a subject of the Emperor of Russia, residing at Chicago, in the county of Cook and State of Illinois, have invented certain new and useful Improvements in Gages, of which the following is a specification.

The gage which is the subject matter of the present application for patent is designed more particularly for obtaining the height of and marking lines in laying out such work as templet, gage and die work, and also to obtain the location of bushings in jigs, etc.

It is the object of the invention to provide a simple and efficient gage of this kind which is capable of fine adjustment, and one which can be easily set and read.

These objects are attained by means of a novel combination and arrangement of parts to be hereinafter described and claimed, and in order that the invention may be better understood, reference is had to the accompanying drawings, in which—

Figures 1 and 2 are elevations showing two adjustments of the gage, Fig. 1 being partly broken away.

Referring specifically to the drawings, 10 denotes a base from which rises a bar 11 of suitable length. The gage is designed to obtain vertical distances, and the base is therefore provided to support the bar in perpendicular position.

On the bar 11 is slidably mounted a carriage 12 which may be locked in adjusted position by a clamping screw 13. From one edge of the carriage projects an arm 14 having its outer end reduced on top to form a seat 15 for a pointer 16 in which seat the jaw is held by a clamp 17. The outer end of the pointer is sharp so that it may be employed for marking. The pointer may be clamped to the bottom of the arm and thus reversed, as shown by dotted lines in Fig. 1.

On the bar 11, above the carriage 12, is slidably mounted an auxiliary carriage 18 which may be locked in adjusted position by a clamping screw 19. The forward end of the auxiliary carriage has a slot 20 in which seats, and is held against travel, a nut 21 carried by a screw 22 which passes loosely through the carriage, parallel to the bar 11, its lower end being loosely embedded in the top of the main carriage 12.

The arm 14 carries a micrometer 23, the stem 24 of which works in a vertical aperture 25 in the arm 14. A standard micrometer, reading .0001, is provided. The arm 14 carries a clamping screw 26 for locking the micrometer stem.

With the micrometer stem 24 coöperates a gage stem 27 of a standard length. A number of these stems 27 of different dimensions is provided.

The gage is operated as follows: Let it be assumed that a measurement of 7.2506 inches is to be taken. The micrometer 23 is set to the .2506 of an inch, the carriages 12 and 18 being first slid upward on the stem for a distance to accommodate a stem 27 having a length of six inches. This stem is set on the base 10 to come directly under the end of the micrometer stem 24 and parallel to the bar. The auxiliary carriage 18 is now locked on the bar 11 by the screw 19, and the main carriage 12 is then adjusted downward by the nut 21 and screw 22 until the lower end of the micrometer stem touches the upper end of the stem 27, after which the main carriage is locked by the screw 13. The tip of the pointer 16 now has an elevation of 7.2506 inches. The height of the base, plus the vertical distance between the tip of the pointer 16 and the lower end of the micrometer stem 24 at zero, is one inch, which must be taken into consideration when selecting the stem 27. Thus a measurement of between two and three inches requires a one-inch stem; between three and four inches, a two inch stem, etc.

For measurements necessitating a very long stem 27, as shown in Fig. 2, supports 28 for said stem are provided. These supports are mounted on the bar 11 and locked thereon by clamping screws 29, and have jaws 30 to engage the stem.

If the height of the bottom portion of a piece of work is to be determined, the pointer 16 will be reversed as shown by dotted lines in Fig. 1.

The bottom of the base is sunken, as indicated at 31, forming a marginal rim which latter is interrupted at 32 to permit the escape of dust and dirt. This structure keeps the bottom of the base perfectly flat, which is essential for fine measurements.

I claim:

1. A gage comprising a base, a bar rising from the base, a carriage slidably mounted on the bar, said carriage having an outstanding arm, means for adjusting the carriage, a micrometer carried by the aforesaid arm, a pointer mounted on the arm and projecting therefrom, means for adjustably clamping the pointer on the arm, and a gage stem adapted to be mounted on the base in alinement with the stem of the micrometer to limit the travel of the carriage in the direction of the base.

2. A gage comprising a base, a bar rising from the base, a carriage slidably mounted on the bar, a micrometer and a pointer on the carriage, a gage stem mounted on the base parallel to the bar in alinement with the stem of the micrometer, means for adjusting the carriage in the direction of the base, and supporting members for the gage stem mounted on the bar, said members having jaws at their outer ends to engage said stem.

In testimony whereof I affix my signature in presence of two witnesses.

EDWARD CORFF.

Witnesses:
S. J. LEHRER,
H. G. BATCHELOR.